United States Patent
Okabe et al.

(10) Patent No.: US 7,621,661 B2
(45) Date of Patent: Nov. 24, 2009

(54) INTERIOR ILLUMINATION LAMP HAVING IMPROVED RETAINING MECHANISM

(75) Inventors: Toshiaki Okabe, Haibara-gun (JP); Kenji Oishi, Haibara-gun (JP); Yasuhiro Matsunaga, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 408 days.

(21) Appl. No.: 11/136,562

(22) Filed: May 25, 2005

(65) Prior Publication Data

US 2005/0265036 A1 Dec. 1, 2005

(30) Foreign Application Priority Data

May 25, 2004 (JP) ............... P. 2004-154258

(51) Int. Cl.
*B60Q 1/00* (2006.01)

(52) U.S. Cl. ............... 362/488; 362/364; 362/368

(58) Field of Classification Search ............ 362/490, 362/493, 362, 364, 365, 368, 492, 488
See application file for complete search history.

(56) References Cited

U.S. PATENT DOCUMENTS

| | | | | |
|---|---|---|---|---|
| 2,713,113 | A | * | 7/1955 | Snook ............... 362/505 |
| 2,902,918 | A | * | 9/1959 | Swarner ............. 454/103 |
| 3,035,161 | A | * | 5/1962 | Kalt ................. 362/479 |
| 6,909,408 | B2 | * | 6/2005 | Matko et al. ........... 345/7 |

FOREIGN PATENT DOCUMENTS

| | | | | |
|---|---|---|---|---|
| JP | 08108795 | A | * | 4/1996 |
| JP | 09240368 | A | * | 9/1997 |
| JP | 10100790 | A | * | 4/1998 |
| JP | 2001253293 | A | * | 9/2001 |
| JP | 2001-280315 | A | | 10/2001 |
| JP | 2002-106529 | A | | 4/2002 |
| JP | 2003-95018 | A | | 4/2003 |
| JP | 2003095018 | A | * | 4/2003 |
| JP | 2004134126 | A | * | 4/2004 |

OTHER PUBLICATIONS

USPTO English Translation of Japanese Publication JP 2003-95018A (Translated by: The McElroy Translation Company).*
Japanese Office Action dated Nov. 25, 2008.

* cited by examiner

*Primary Examiner*—Jong-Suk (James) Lee
*Assistant Examiner*—Kevin Spinella
(74) *Attorney, Agent, or Firm*—Sughrue Mion, PLLC

(57) ABSTRACT

An interior illumination lamp 1 includes a housing 13 for mounting in an opening 12 formed in an interior member 11 of a vehicle, upstanding members 14 extending from a reverse surface 13a of the housing 13, bending members 15 connected to distal ends of the upstanding members 14, and a plurality of pairs of prevention portions 17 disposed adjacent the upstanding members 14. The prevention portions 17 lock the bending member 15 such that the interior member 11 is locked therebetween. Angle maintaining means 18 prevent the bending members from being bent too far so that the interior member is not compressed too much.

6 Claims, 6 Drawing Sheets

INTERIOR ILLUMINATION LAMP HAVING IMPROVED RETAINING MECHANISM

BACKGROUND OF THE INVENTION

1. Field of the Invention

This invention relates to an interior illumination lamp suitably used in a vehicle.

2. Related Art

An interior illumination lamp, used for illuminating the inside of a vehicle room and for other illumination purposes as when making up the user's face, is mounted on a ceiling surface of the vehicle or a sun visor.

FIG. 6 shows a conventional interior illumination lamp 50 (see, for example, Unexamined Japanese Patent Publication 2003-95018). This interior illumination lamp 50 comprises a lamp base portion 51 for mounting on an interior member 54, and a lens 55 mounted on the lamp base portion 51.

As shown in FIG. 7, a plate portion 62 which can be bent at a hinge portion 56 is formed on and projects from a reverse surface 51a of the lamp base portion 51, and retaining ribs 63 which can be retainingly engaged respectively in holes 62a formed through the plate portion 62 are also formed on and project from the reverse surface 51a. The reverse surface 51a of the lamp base portion 51 and the bent plate portion 62 hold the interior member 54 therebetween, thereby mounting the lamp base portion 51 on the interior member 54.

In the conventional interior illumination lamp 50, however, at the time when the plate portion 62 is brought into retaining engagement with the retaining ribs 63 after these retaining ribs 63 pass respectively through the holes 62a, an excessive pressing force is applied from the plate portion 62 to the interior member 54 in a direction of the thickness of this interior member 54, so that the interior member 54 is squeezed, and therefore is subjected to plastic deformation. As a result, a gap is formed between the interior member 54 and the plate portion 62, which has invited a problem that a self-holding ability of the interior illumination lamp is lowered.

SUMMARY OF THE INVENTION

This invention has been made in view of the above circumstances, and an object of the invention is to provide an interior illumination lamp which can prevent an interior member from being squeezed, thereby preventing a self-holding ability of the interior illumination lamp from being lowered.

According to the present invention, there is provided an interior illumination lamp provided in that the lamp comprises a housing for mounting in an opening formed in an interior member of a vehicle, upstanding members formed in an upstanding manner on a reverse surface of the housing, bending members which are connected respectively to distal ends of the upstanding members, and can be bent to be disposed generally parallel to the reverses surface of the housing, and prevention portions which are provided on the reverse surface of the housing, and are disposed adjacent respectively to the upstanding members, and each of the prevention portions prevents the corresponding bending member from being restored from a bent condition to an upstanding condition when an engagement portion, formed on the bending member, slides past the prevention portion; and the reverse surface of the housing and the bending members hold the interior member therebetween, thereby mounting the housing on the interior member; and there are provided angle maintaining means each for keeping the corresponding bending member, bent into the bent condition, at a predetermined bending angle.

The interior illumination lamp of the invention is further provided in that the angle maintaining means serves also as a stopper provided at the prevention portion.

In the invention, when the bending member is held in the bent condition by the prevention portion, the bending member is prevented by the angle maintaining means from being further bent beyond this bent position, and therefore the interior member is prevented from being squeezed by the bending member.

In the case where the angle maintaining means serves also as the stopper, the angle maintaining means can be simplified in construction.

As described above, in the present invention, the bending member in the bent condition is kept at the predetermined bending angle by the angle maintaining means, and therefore the interior member is prevented from being squeezed by the bending member in a direction of a width of the interior member. Therefore, a gap is prevented from developing between the interior member and the upstanding member, thereby preventing a self-holding ability of the interior illumination lamp from being lowered.

DETAILED DESCRIPTION OF THE PREFERRED EMBODIMENTS

A preferred embodiment of the present invention will now be described with reference to the drawings.

Figure 1:
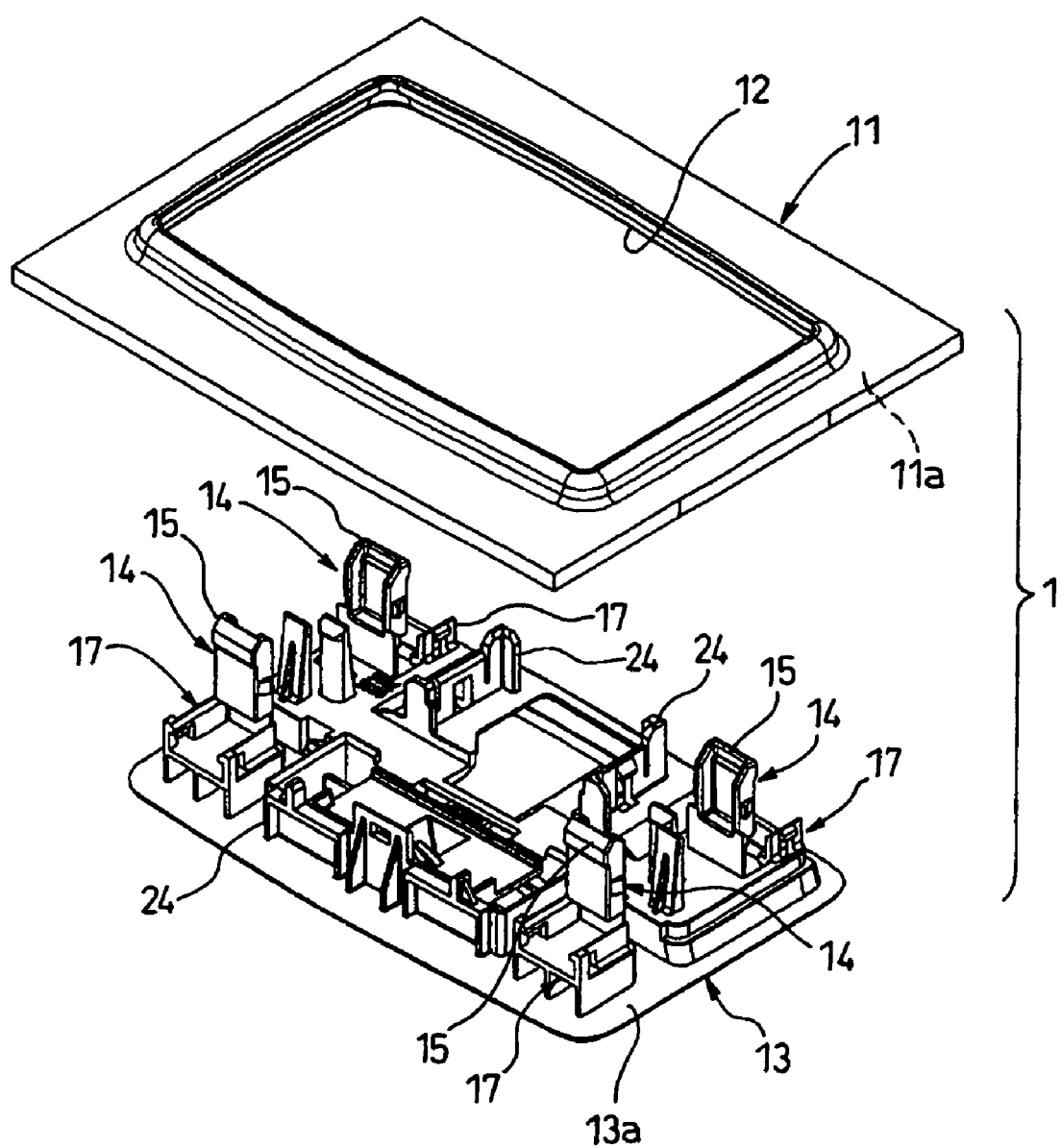
FIG. 1 is an exploded, perspective view showing an interior member and a housing in a preferred embodiment of the present invention.

FIG. 1 shows an interior illumination lamp 1 of the present invention. This interior illumination lamp 1 comprises a housing 13 for mounting in an opening 12 formed in an interior member 11 of a vehicle, upstanding members 14 formed in an upstanding manner on a reverse surface 13a of the housing 13, and bending members 15 which are connected respectively to distal ends of the upstanding members 14, and can be bent to be disposed generally parallel to the reverses surface 13a of the housing 13.

The interior illumination lamp 1 further comprises a plurality of pairs of prevention portions 17 which are provided on the reverse surface 13a of the housing 13, and are disposed adjacent respectively to the upstanding members 14. Each pair of the prevention portions 17 prevent the corresponding bending member 15 from being restored from a bent condition to an upstanding condition when engagement portions 16

(see FIG. 3), formed on the bending member 15, slide respectively past the prevention portions 17.

Figure 2:
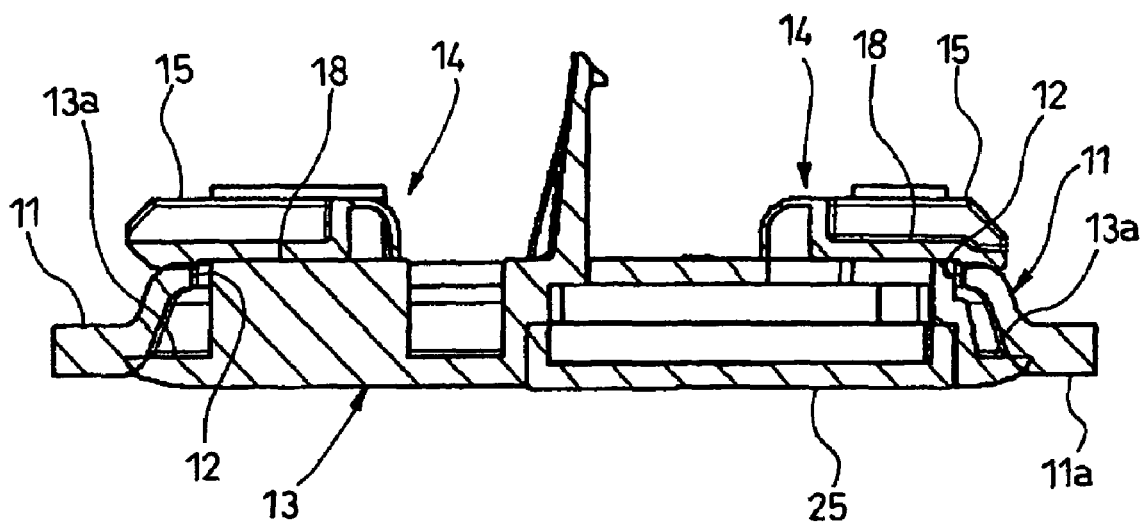
FIG. 2 is a cross-sectional view showing the interior member and the housing in the embodiment of the invention.

As shown in FIG. 2, the reverse surface 13a of the housing 13 and the bending members 15 hold the interior member 11 therebetween, thereby mounting the housing 13 on the interior member 11. The interior illumination lamp 1 further includes angle maintaining means 18 each for keeping the corresponding bending member 15, bent into the bent condition, at a predetermined bending angle.

Next, the construction of each of the constituent elements will be described. As shown in FIG. 1, the opening 12 in the interior member 11 has a predetermined shape (a generally rectangular shape in this embodiment). The housing 13 is similar in shape to the opening 12.

A plurality of projections 24 for fitting into the opening 12 in the interior member 11 are formed on the reverse surface 13a of the housing 13, and are arranged along an outer peripheral edge of the housing 13. A lens 25 (see FIG. 2) is mounted on the housing 13.

In this embodiment, the four upstanding members 14 are provided so as to support four corner portions of the opening portion 12 of the interior member 11. These upstanding members 14 have a relatively large width. Each pair of opposed upstanding members 14, having their wide surfaces opposed to each other, can be bent in opposite directions, respectively.

Figure 3:
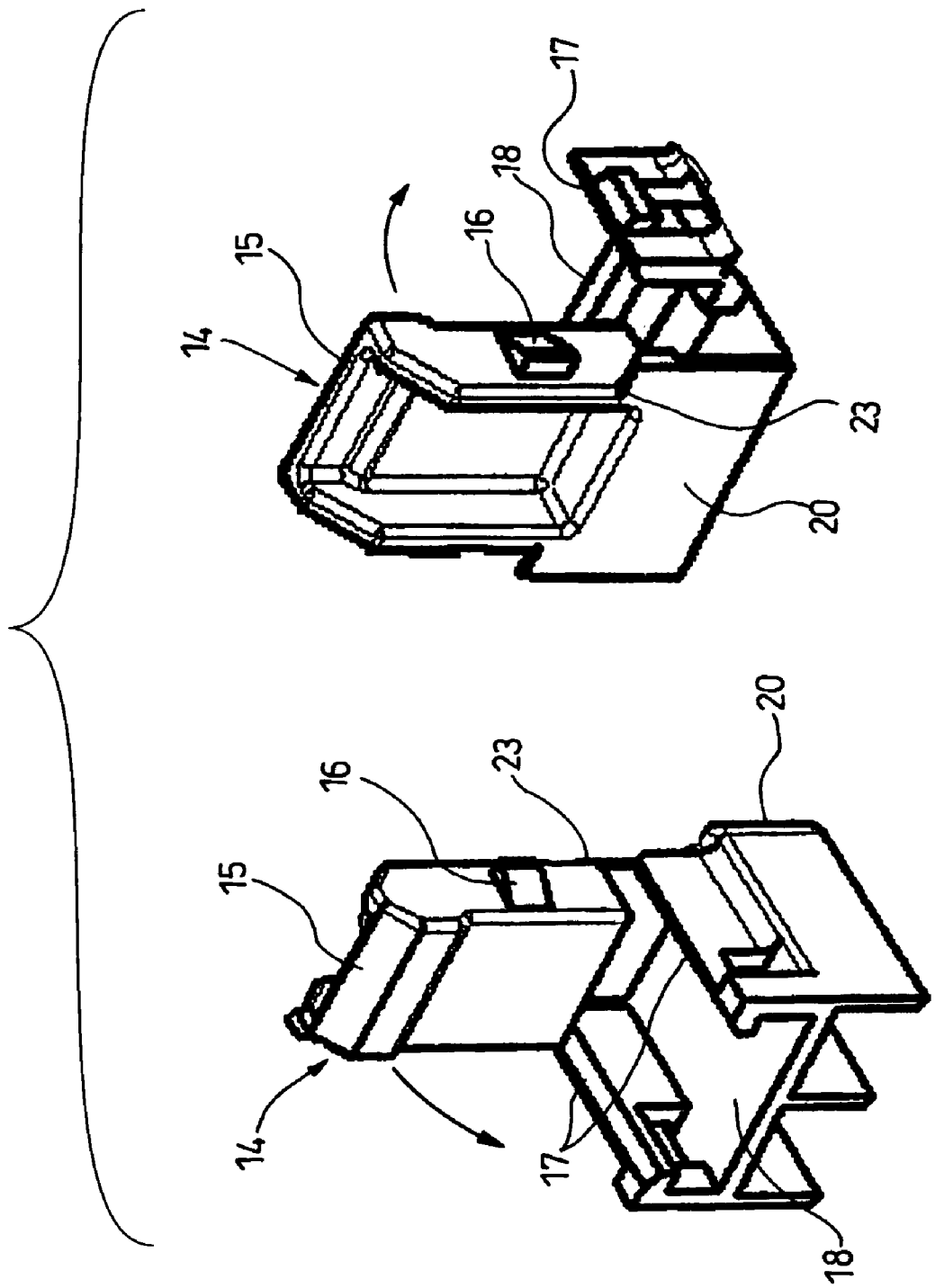
FIG. 3 is a perspective view showing an upstanding member and a bending member in the embodiment of the invention

As shown in FIG. 3, each of the upstanding portions 14 is formed on a base portion 20 having a predetermined height. Each pair of opposed upstanding members 14 can be bent respectively in the opposite directions through respective hinges 23 each formed at a boundary portion between the upstanding member 14 and the base portion 20.

The engagement portions 16 and 16 for retaining engagement respectively with the prevention portions 17 and 17 are formed on opposite side surfaces of the bending member 15, respectively. When the bending member 15 is bent, the engagement portions 16 and 16 slide past the prevention portions 17 and 17, respectively, and are brought into retaining engagement with the prevention portions 17 and 17, respectively. As a result, the bending member 15 is prevented from being restored from the bent condition to the upstanding condition.

In this embodiment, when the bending member 15 is bent at the predetermined angle (about 90 degrees in this embodiment), the bending member 15 is retained through the engagement portions 16 and 16 and the prevention portions 17 and 17, and abuts against the angle maintaining means 18, and therefore is stopped. Namely, in this embodiment, the angle maintaining means 18 functions also as a stopper.

When the bending member 15 is held against the angle maintaining means 18, a gap which is slightly smaller than the thickness of the interior member 11 is formed between the reverse surface 13a of the housing 13 and the bending member 15.

Figure 4:
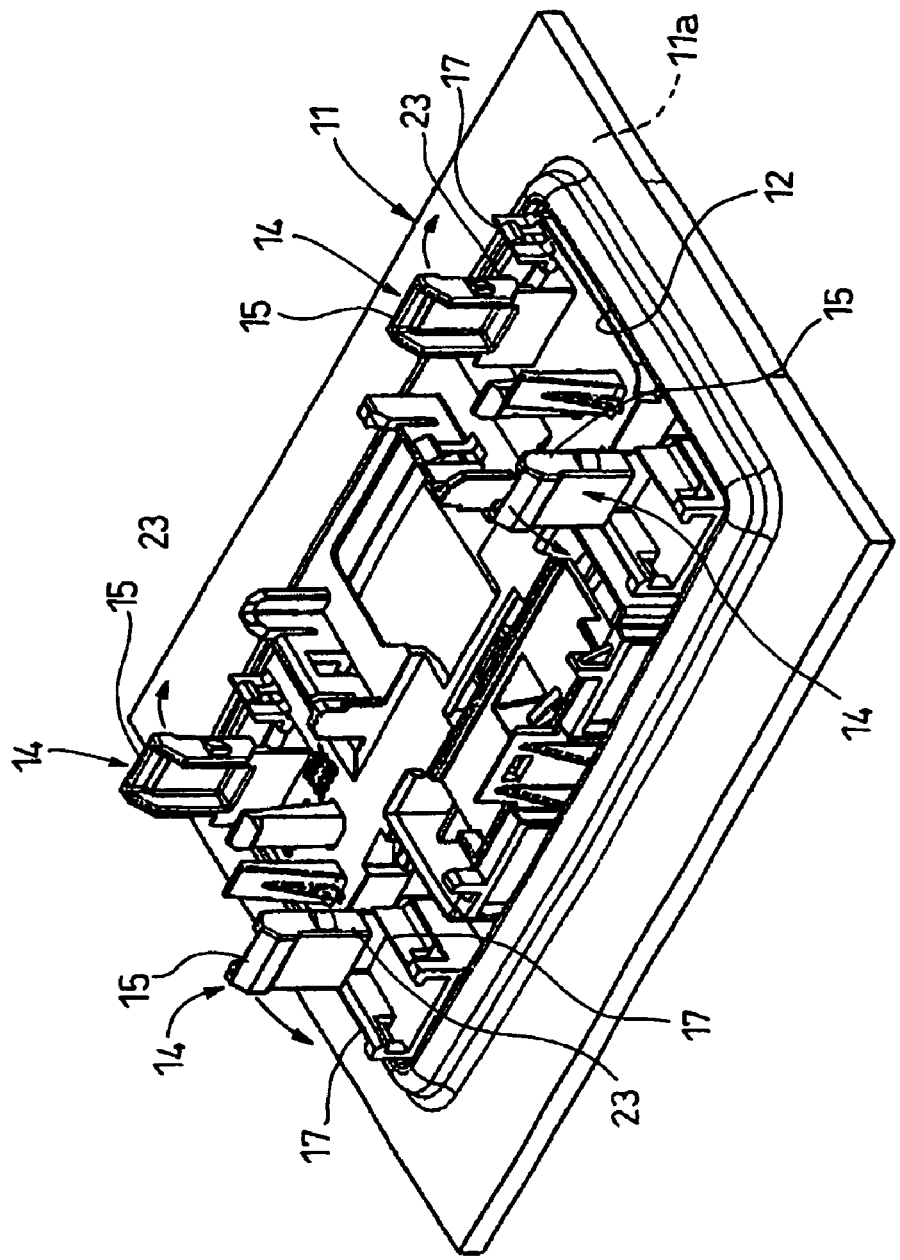
FIG. 4 is a perspective view showing a condition in which the housing is fitted in the interior member.

FIG. 4 shows a condition in which the housing 13 is inserted in the opening 12 in the interior member 11, and the bending members 15 of the upstanding members 14 are not yet bent. In this condition, a front surface 11a of the interior member 11 abuts against the reverse surface 13a of the housing 13.

Figure 5:
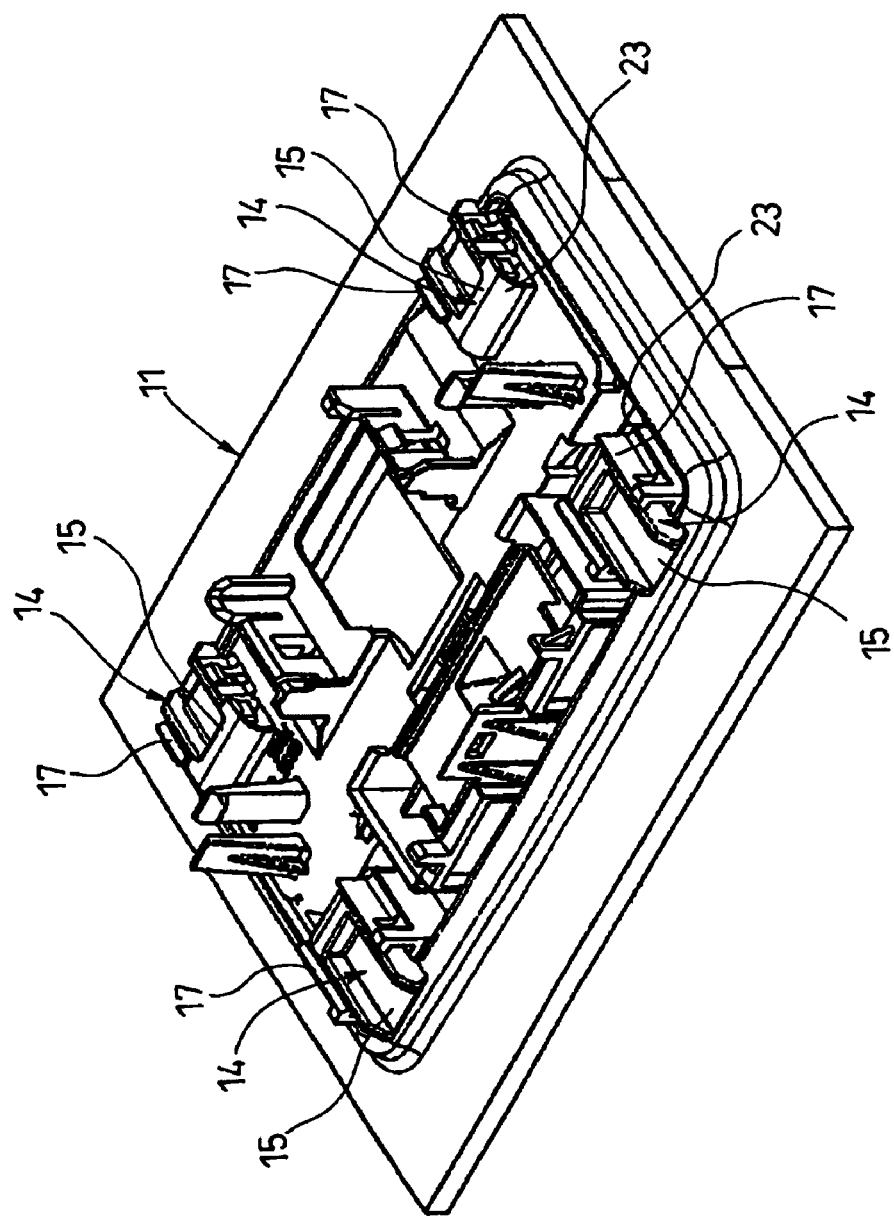
FIG. 5 is a perspective view showing a condition in which the housing is fitted in the interior member, and the bending members are bent.
Figure 6:
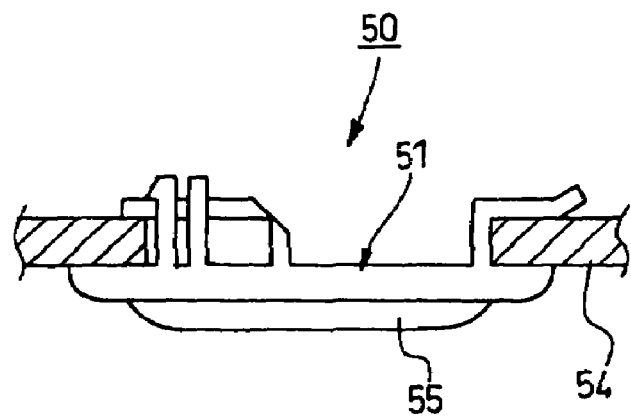
FIG. 6 is a perspective view showing a conventional lamp base.
Figure 7:
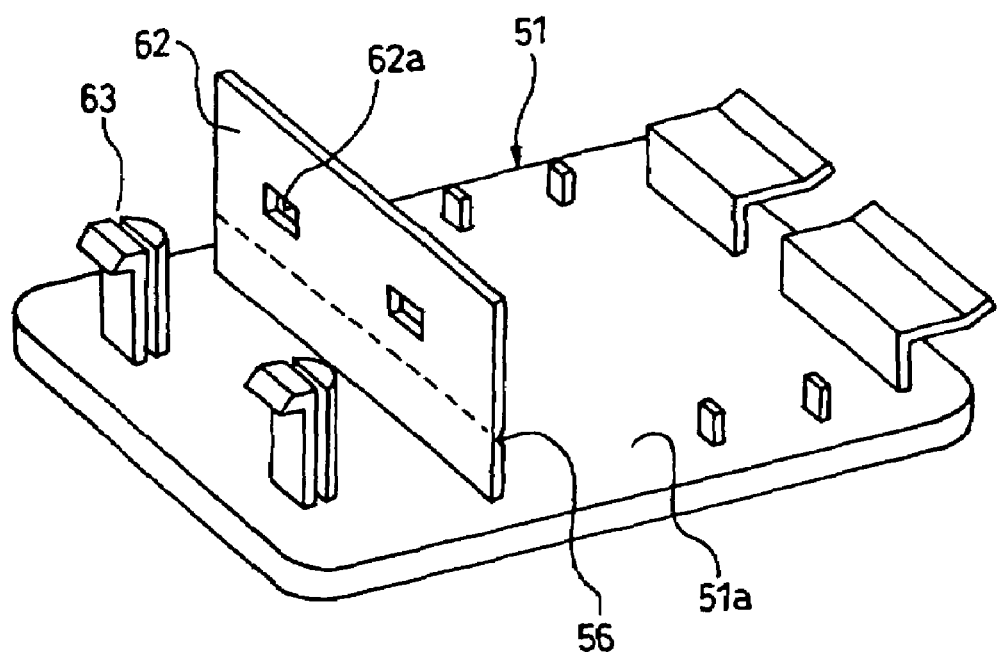
FIG. 7 is a cross-sectional view showing a condition in which the conventional lamp base is mounted on an interior member.

In this condition, the bending member 15 of each upstanding member 14 is bent outwardly at the hinge 23 as shown in FIG. 5. As a result, the peripheral edge portion of the opening 12 in the interior member 11 is gripped by or held between each bending member 15 and the reverse surface 13a of the housing 13.

At this time, the angle of bending of the bent bending member 15 is maintained by the angle maintaining means 18, and therefore the interior member 11 is prevented from being excessively pressed by the bending member 15, and therefore is prevented from being squeezed by the bending member 15.

Therefore, a gap is prevented from developing between the interior member 11 and the bending member 15, and therefore the interior illumination lamp 1 is prevented from shaking, so that a self-holding ability of the interior illumination lamp 1 is prevented from being lowered.

In this embodiment, although the angle maintaining means 18 serves also as the stopper, this angle maintaining means 18 can be replaced by any other suitable angle maintaining means in so far as it can prevent the bending member 15 from being bent relative to the upstanding member 14 through an angle, for example, larger than 90 degrees.

One example of such angle maintaining means is a notch which is formed in the hinge 23, and is cut into a V-shape in the direction of bending of the bending member 15. In this case, by setting the angle of the notch to about 90 degrees, the bent bending member 15 can be kept at the bending angle of about 90 degrees.

What is claimed is:

1. An interior illumination lamp comprising:
   a housing for mounting in an opening formed in an interior member of a vehicle,
   upstanding members formed in an upstanding manner on a reverse surface of said housing,
   bending members connected respectively to distal ends of said upstanding members, and being bent to be disposed generally parallel to the reverse surface of said housing, said bending members having an engagement portion;
   prevention portions provided on the reverse surface of said housing, and disposed adjacent respectively to said upstanding members, each of said prevention portions preventing said bending member from being restored from a bent condition to an upstanding condition when said engagement portion of said bending member slides past said prevention portion; and
   angle maintaining member provided on the reverse surface of the housing for preventing said bending member from being rotated beyond a predetermined bending angle, said angle maintaining member being independent of said prevention portions.

2. An interior illumination lamp according to claim 1, wherein said angle maintaining member serves as a stopper provided at said prevention portion.

3. An interior illumination lamp according to claim 1, wherein said angle maintaining member is a plate.

4. An interior illumination lamp according to claim 3, wherein said plate extends between the prevention portions.

5. An interior illumination lamp according to claim 1, wherein said predetermined bending angle is approximately 90 degrees.

6. An interior illumination lamp according to claim 4, wherein said predetermined bending angle is approximately 90 degrees.

* * * * *